United States Patent [19]

Nelson et al.

[11] Patent Number: 5,623,555
[45] Date of Patent: Apr. 22, 1997

[54] METHOD AND APPARATUS FOR HANDWRITING DECOMPRESSION USING ESTIMATED TIMING INFORMATION

[75] Inventors: Winston L. Nelson, Morristown; William Turin, East Brunswick, both of N.J.

[73] Assignee: Lucent Technologies Inc., Murray Hill, N.J.

[21] Appl. No.: 228,823

[22] Filed: Apr. 18, 1994

[51] Int. Cl.$^6$ ............................... G06K 9/36; G06K 9/46
[52] U.S. Cl. ..................... 382/233; 382/241; 382/242; 382/119; 382/267; 395/142
[58] Field of Search ............................. 382/3, 13, 56, 382/116, 119, 203, 204, 267, 187, 232, 233, 241, 242; 395/142

[56] References Cited

U.S. PATENT DOCUMENTS

| | | | |
|---|---|---|---|
| 4,020,463 | 4/1977 | Himmel | 382/3 |
| 4,513,444 | 4/1985 | Okai et al. | 382/242 |
| 4,550,438 | 10/1985 | Convis et al. | 382/242 |
| 4,703,511 | 10/1987 | Conoval | 382/13 |
| 4,718,103 | 1/1988 | Shojima et al. | 382/241 |
| 4,809,195 | 2/1989 | Bechet | 382/119 |
| 4,949,281 | 8/1990 | Hillenbrand et al. | 382/22 |
| 5,091,975 | 2/1992 | Berger et al. | 382/56 |
| 5,095,510 | 3/1992 | Webster | 382/3 |
| 5,101,437 | 3/1992 | Plamondon | 382/3 |
| 5,123,060 | 6/1992 | Cho et al. | 382/50 |
| 5,233,671 | 8/1993 | Murayama | 382/242 |
| 5,285,506 | 2/1994 | Crooks et al. | 382/13 |
| 5,347,589 | 9/1994 | Mecks et al. | 382/3 |
| 5,408,598 | 4/1995 | Pryor, Jr. | 395/142 |

FOREIGN PATENT DOCUMENTS

| | | | |
|---|---|---|---|
| 0447176A2 | 9/1991 | European Pat. Off. | G06F 15/72 |
| 0586219A2 | 3/1994 | European Pat. Off. | G06F 15/64 |
| 2229337 | 9/1990 | United Kingdom | H04N 1/411 |

OTHER PUBLICATIONS de Boor, Carl, *A Practicle Guide to Splines*, Springer–Verlag, New York, 1978, pp. 315–318.

IEEE Transactions on Systems, Man and Cybernetics, Sep.–Oct. 1989, USA, vol. 19, No. 5, ISSN 0018–9472, pp. 1060–1072.

Proceedings, 1992 IEEE Computer Society Conference on Computer Vision and Pattern Recognition, Champaign, Il. 15–18 Jun. 1992, Los Alamitos, CA IEEE Comput. Soc. Press, pp. 162–168.

Patent Abstracts of Japan, vol. 009 No. 217, p. 385, 4 Sep. 1985.

*Primary Examiner*—Leo Boudreau
*Assistant Examiner*—Bipin Shalwala

[57] ABSTRACT

A method and apparatus for generating a reconstructed image from a compressed image. An exemplary method in accordance with the present invention includes the steps of identifying pairs of compressed image data points having a connection therebetween in a linear segment approximation of the reconstructed image; estimating timing information such as a number of original image data points between each of the connected pairs of compressed image data points; and fitting a spline segment to each of the pairs of compressed image data points and the estimated number of original image data points corresponding thereto, such that the fitted spline segments in combination form the reconstructed image. The reconstructed image may then be smoothed by replacing spline segments which produce undesirable deviations in the reconstructed image with conic section spline segments. The timing information may be estimated using, for example, a linear time model, in which a fixed number of original image data points are estimated between each pair of compressed image data points, or a constant velocity model, in which the estimated number of original image data points is proportional to, or more generally, a function of the distance between the pair of compressed points. One such function of distance particularly well-suited to reconstruction of handwriting images is a square root of the distance.

26 Claims, 6 Drawing Sheets

METHOD AND APPARATUS FOR HANDWRITING DECOMPRESSION USING ESTIMATED TIMING INFORMATION

BACKGROUND OF THE INVENTION

1. Field of the Invention

The present invention relates generally to electronic image decompression. More particularly, the present invention relates to improvements in reconstructing images from compressed image data using estimated timing information.

2. Description of Prior Art

An increasing number of modern data processing applications utilize electronic document images in place of or in conjunction with paper documents. For example, electronic images of customer signatures may be used to authorize credit requests in electronic Point of Sale (POS) transactions. The electronic image of the customer signature is typically compressed and then transmitted to a remote central database for verification, storage, or other processing. If necessary, a physical record of the transaction may be readily generated from the electronic image at the remote site. In such transactions, it is often very important that the compressed electronic image, when reconstructed, is perceptually indistinguishable from the original. The reconstructed image may then be used, for example, to verify the authenticity of a customer signature. Similar authenticity concerns are present with many other types of electronic document images.

Image compression techniques, however, are typically directed to reducing the amount of digital data needed to represent a particular image, and often discard certain image information in the interest of data reduction. When the compressed data is subsequently decompressed, the reconstructed image may therefore exhibit large deviations from the original. In the case of a handwritten signature, the reconstructed image may not be sufficiently similar to the original to serve as a basis for verifying authenticity. U.S. Pat. No. 5,091,975, which is incorporated by reference herein, discloses an exemplary data compression technique.

One known compression technique involves using a plurality of linear segments to approximate the original image. The electronic image data points making up, for example, a signature are compressed by approximating a group of original image data points as a linear segment connecting a pair of compressed image data points, also referred to as anchor data points. The image is reconstructed by simply connecting each pair of compressed image data points by a linear segment. Linear segment approximation techniques can compress image data by a factor of as much as ten to one.

A significant problem with linear segment approximation techniques is that timing information, such as the number of original image data points between each pair of compressed image data points, is usually lost in the compression process. The reconstructed image is therefore often perceptually different from the original image. In the case of a signature, proper authentication may not be possible using the reconstructed image. Of course, a higher resolution reconstructed image may be obtained by using more compressed image data points. Additional image data, however, results in slower image retrieval, transmission and processing rates, higher memory capacity requirements for image storage, and higher equipment costs.

As is apparent from the above, a need exists for a method and apparatus for reconstructing compressed image data which provide improvements in reconstructed images without increasing the amount of compressed image data.

SUMMARY OF THE INVENTION

The present invention provides a method and apparatus for reconstructing images from compressed image data. In accordance with one aspect of the present invention, a method is provided which includes the steps of identifying pairs of compressed image data points having a connection therebetween in a linear segment approximation of the reconstructed image; estimating timing information between each of the connected pairs of compressed image data points; and fitting a cubic polynomial curve segment to each of the pairs of compressed image data points using the estimated timing information, such that the fitted cubic polynomial curve segments in combination form the reconstructed image.

In accordance with another aspect of the present invention, the reconstructed image may be smoothed by, for example, identifying the cubic polynomial curve segments which produce undesirable deviations in the reconstructed image, and replacing the identified cubic polynomial curve segments with conic section curve segments.

For electronic images captured by an image digitizer operating at a fixed sampling rate, a timing model can be expressed in terms of the number of original image data points between each connected pair of compressed image data points. Different timing models specify different parametrizations for curve fitting and are used herein as techniques for estimating timing information. It should be noted, however, that because the image reconstruction of the present invention generally uses curve segments specified by analytical expressions, such as cubic splines and conic sections, the actual number of points in a given plot or other display of the reconstructed image depends on the resolution of the display device.

In one embodiment of the present invention, the timing information may be estimated using a linear time timing model, in which a fixed number of original image data points is estimated between each of the compressed image data points. Under the linear time model, for example, straight portions of a handwritten signature are assumed to be written faster than high curvature portions.

In another embodiment of the present invention, the timing information may be estimated using a constant velocity timing model, in which the estimated number of original image data points between a pair of compressed image data points is assumed to be proportional to the distance between the pair of points. Under this model, for example, both straight and high curvature portions of a handwritten signature are assumed to be written at the same speed.

In other embodiments of the present invention, the timing information may be a more general function of the distance between the pair of points, such as, for example, a square root of the distance.

As a feature of the present invention, the timing information within the original image is estimated and used in image reconstruction. Estimation errors in the reconstructed image are thereby substantially reduced, and the reconstructed image more closely resembles the original image. The reconstructed image may therefore be used in applications requiring high reconstruction accuracy, such as, for example, verifying electronically-captured signatures.

As another feature of the present invention, the improvements in the reconstructed image are obtained without increasing the amount of data in the compressed image. By estimating timing information which has been lost upon compression, the present invention provides substantial improvements in the reconstructed image as compared to currently available decompression techniques.

The above-discussed features, as well as additional features and advantages of the present invention, will become more readily apparent by reference to the following detailed description and the accompanying drawings.

DETAILED DESCRIPTION

Figure 1:
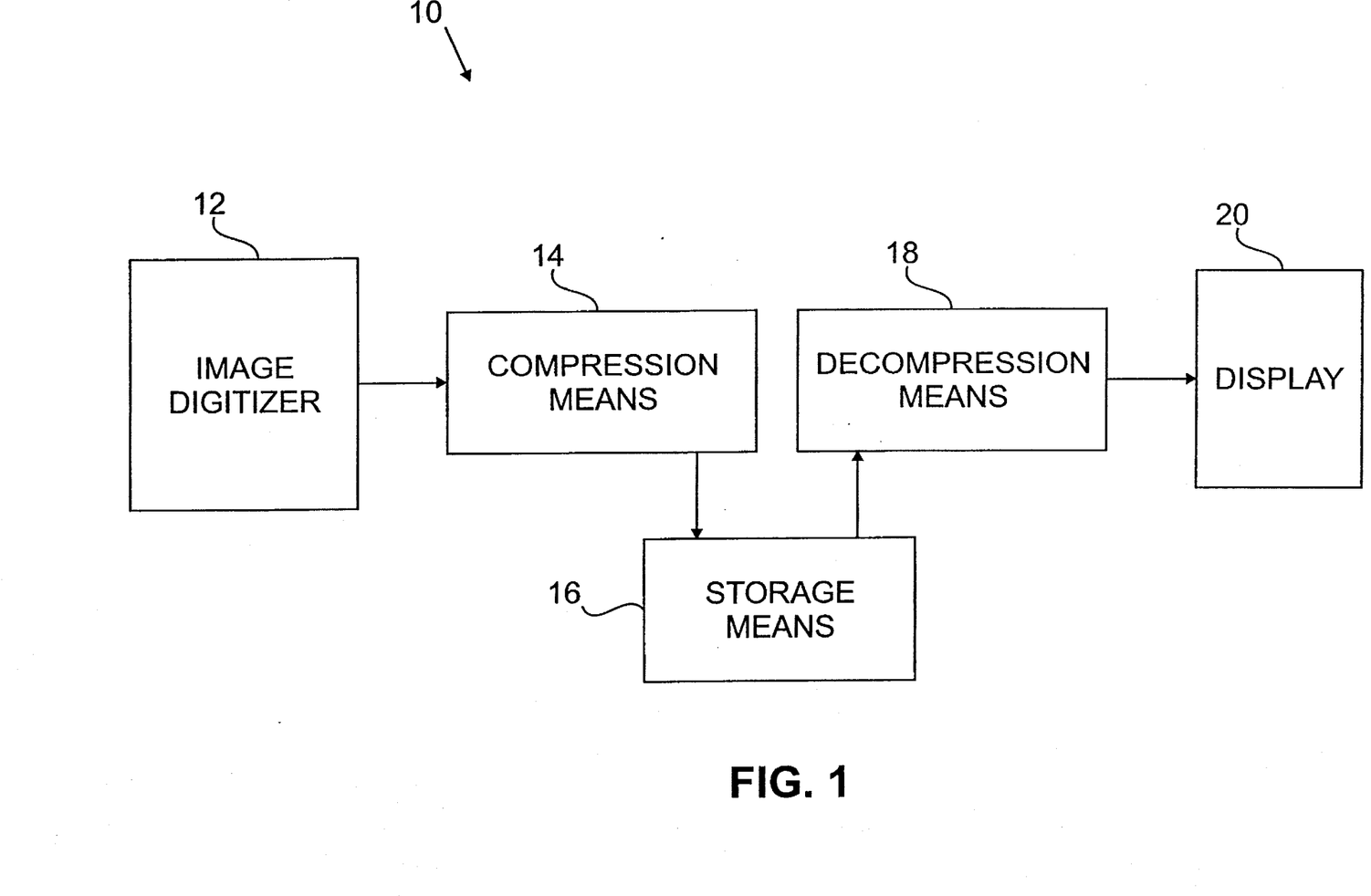
FIG. 1 is a block diagram of an exemplary system in which compressed electronic images may be reconstructed in accordance with the present invention.

FIG. 1 shows a system in which compressed electronic images may be reconstructed in accordance with the present invention. It should be noted that the system 10 is exemplary only and the present invention may be utilized in any system which generates, stores, transmits, reconstructs, displays or otherwise processes electronic images. For example, the present invention may be used to improve reconstruction of images generated using the systems described in U.S. Pat. Nos. 4,020,463 and 5,285,506, both of which are incorporated by reference herein. The present invention may also be used to improve an image previously reconstructed using another decompression technique. A compressed image will therefore, as the term is used herein, refer to any electronic image which includes less image information than the original image, and a reconstructed image will refer to an image resulting from applying a decompression technique to a compressed image.

The exemplary system 10 includes an electronic image digitizer 12, a compression means 14, a storage means 16, a decompression means 18 and a display 20. The digitizer 12 generates an electronic image including a plurality of original image data points representative of an original image. The digitizer 12 may be, for example, an electronic tablet or writing pad which electronically captures images of signatures or other information drawn thereon. An exemplary electronic writing pad is described in greater detail in the above-cited U.S. Pat. No. 5,285,506. Alternatively, the digitizer 12 may include a camera or other scanner for electronically scanning an existing document. As used herein, a document includes any type of recorded visual information which may be digitized and represented in the form of an electronic image.

The electronic image is compressed in compression means 14, and the resulting compressed image is stored in storage means 16. The compressed image may then be reconstructed, or decompressed, in decompression means 18 and the reconstructed image viewed on display 20. The compression means 14 and decompression means 18 may be hardware or software implementing any of a number of known algorithms based on linear segment approximation or other techniques. The compression means 14 and decompression means 18 may each be, for example, an integrated circuit or a software program designed to run on a digital data processor. The storage means 16 may be any of a number of digital storage devices capable of storing an electronic image or at least a portion thereof, including a magnetic disc or tape memory, an optical disc memory, or an electronic memory. The display 20 may be, for example, a video terminal or a printer. The system 10 may include one or more digital data processors, such as personal computers, which are not shown, for controlling and coordinating the operation of the various system elements. The storage means 16 may be incorporated as a memory in one or more of the digital data processors.

In other embodiments of system 10, the storage means 16 may be eliminated such that the compressed image is directly transmitted, over a computer network, telephone network, or other communication link, to the decompression means 18 or to a central computer for further processing. In yet another embodiment, the display 20 could be eliminated and the decompression means 18 could supply a reconstructed image to, for example, a digital data processor. The reconstructed image could then be compared electronically with a previously-stored image for verification purposes. In a further embodiment, the image digitizer 12 and compression means 14 could be eliminated and the system 10 could operate on, for example, a database of electronic signature images previously supplied to storage means 16 from, for example, a central database in a bank or credit card company. These variations illustrate that, as noted above, the present invention is not limited to use with any particular electronic image system.

The electronic image generated by digitizer 12 may be specified by a function $f(x,y)$ which indicates, for example, a grayscale value for each possible combination of x and y. The values x and y specify the horizontal and vertical location coordinates, respectively, of a given data point, or pixel, within the original image. If $f(x,y)$ is an n-bit grayscale image, each of the data points may take on one of $2^n$ possible grayscale values. A grayscale image $f(x,y)$ may be converted to a binary, or black and white, image $b(x,y)$ using a process commonly known as thresholding, in which a value of zero is assigned to every data point with grayscale value below a certain threshold, and a value of one to every data point with a grayscale value above the threshold. Alternatively, a binary image $b(x,y)$ may be generated directly by the digitizer 12, as is often the case in electronic image digitizers designed for handwriting capture.

The binary image $b(x,y)$ is the original uncompressed electronic image in binary form. The image $b(x,y)$ includes a number of original image data points having a value of one, with all others having a value of zero. The original image can therefore be reconstructed if the locations of all the data points of one binary value are known. For example, if the original image is a handwritten signature, the electronic image need only include the locations of the data points which make up the signature. However, the amount of data required to represent every data point of one binary value in a given image b(x,y) may still be excessive in many applications. For this reason, the image b(x,y) is typically supplied to the compression means 14, in which a compressed image with a reduced number of data points is generated from the original image b(x,y) using any of a number of well-known techniques.

As noted above, one technique used in compressing images of handwriting is linear segment approximation. Linear segment approximation is used to compress image data generated in, for example, handwriting capture devices such as the Model 5980, 5991 and 5995 units from AT&T Global Information Solutions Company, formerly NCR Corporation, Dayton, Ohio. The linear segment approximation technique, to be described in greater detail below, uses linear segments interconnecting pairs of compressed image data points to approximate the shape of the original image, resulting in a substantial reduction in the total amount of compressed image data. A reconstructed version of the original image may be generated by decompressing the compressed image data points.

Figure 2:
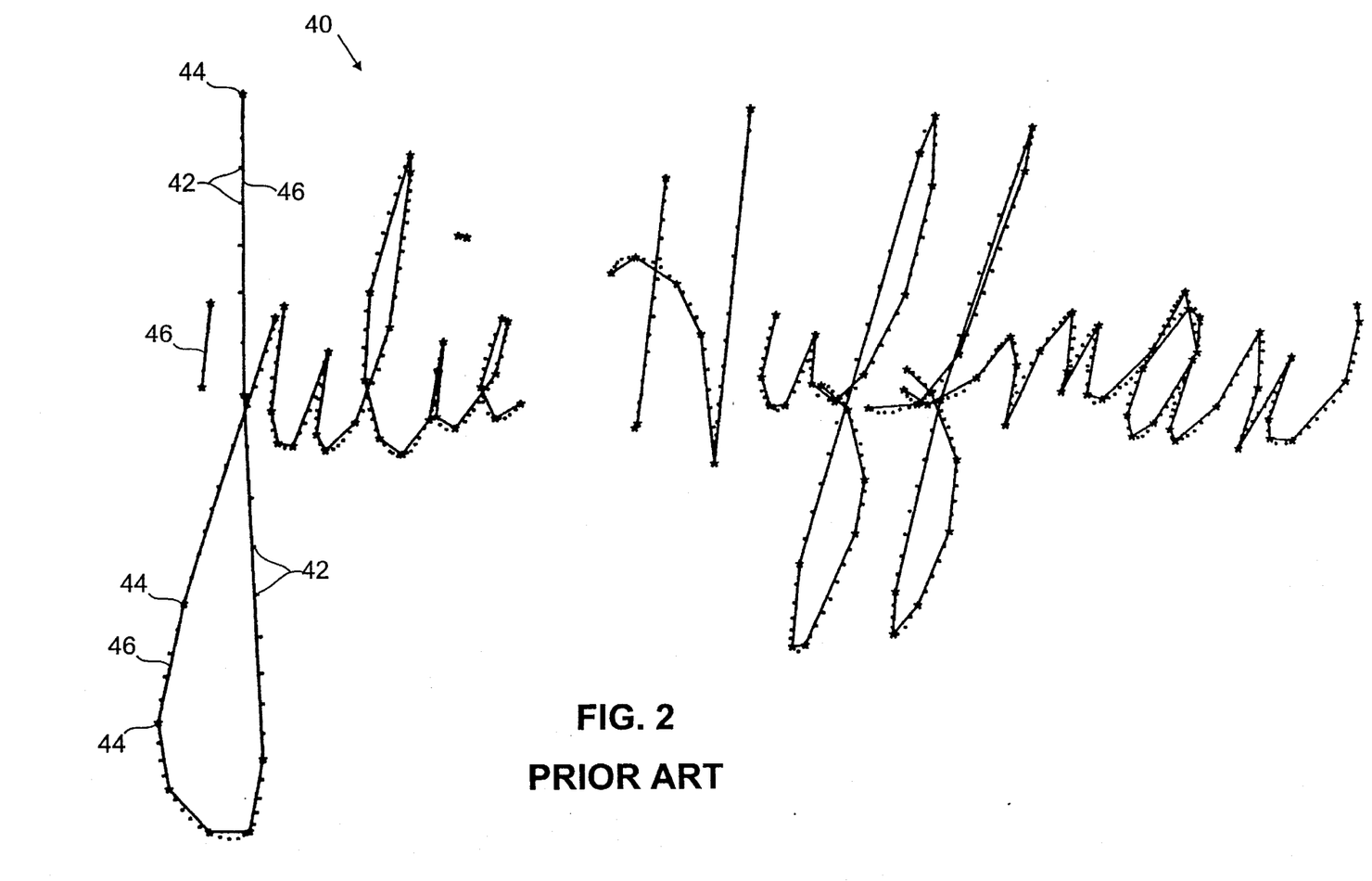
FIG. 2 is an exemplary handwritten signature compressed and reconstructed using a linear segment approximation technique in accordance with the prior art.

FIG. 2 shows an exemplary handwritten signature compressed and reconstructed using a linear segment approximation technique in accordance with the prior art. A reconstructed image 40 is superimposed on a plurality of original image data points 42, each denoted by a small dot and representing one original image data point generated by the image digitizer 12. The digitizer 12 typically samples the handwritten information in the original image at a particular sample rate. A typical sample rate may be about 100 to 300 data points per second. The exemplary handwritten information shown in FIG. 2 was sampled as it was generated on an electronic tablet or writing pad. The distance between the small dots corresponding to the original image data points therefore varies depending upon the speed at which the handwritten information is generated. Closely spaced original image data points correspond to certain portions of the signature, such as portions of high curvature, which generally take longer to write than relatively straight portions of the signature. It should be understood that the original image data points in FIG. 2 are shown primarily to illustrate the deviation of the reconstructed image from the original, and should not be construed as limiting the present invention to use with only certain types of image digitizers or sample rates.

The original image data points are then compressed using a linear segment approximation technique. The compressed image is made up of a plurality of compressed image data points 44, also referred to as anchor data points, which are denoted in FIG. 2 by asterisks. The first compressed image data point may be identified by, for example, a pen-down signal generated in an electronic tablet or writing pad in a manner known in the art. Each pair of compressed image data points 44 specifies a linear segment 46 which approximates the connections between a number of uncompressed original image data points 42. The signature image is thus represented by a reduced number of compressed image data points, such that all original image data points deviate from a linear segment connecting a pair of the compressed image data points by no more than a preset amount. It should be noted that the above-described compression technique does not retain timing information such as, for example, the number of original image data points between each pair of compressed image data points or the time between the compressed image data points.

Prior art decompression techniques may reconstruct the compressed image by, for example, simply connecting each pair of compressed image data points with a linear segment. The reconstructed image 40 in FIG. 2 is an example of a signature image reconstructed by connecting pairs of compressed image data points 44 by linear segments 46. Unfortunately, the reconstructed image 40 may not sufficiently resemble natural handwriting to, for example, permit an accurate verification of its authenticity. Although each original image data point deviates by no more than a preset amount from its corresponding linear segment, the differences between the reconstructed and original signature images on the whole may not permit an accurate comparison with, for example, a known authorized signature image previously generated and stored. Other prior art compression and decompression techniques, including those which utilize various forms of actual timing information, may produce reconstructed images which do not closely correspond to the original image.

Figure 3:
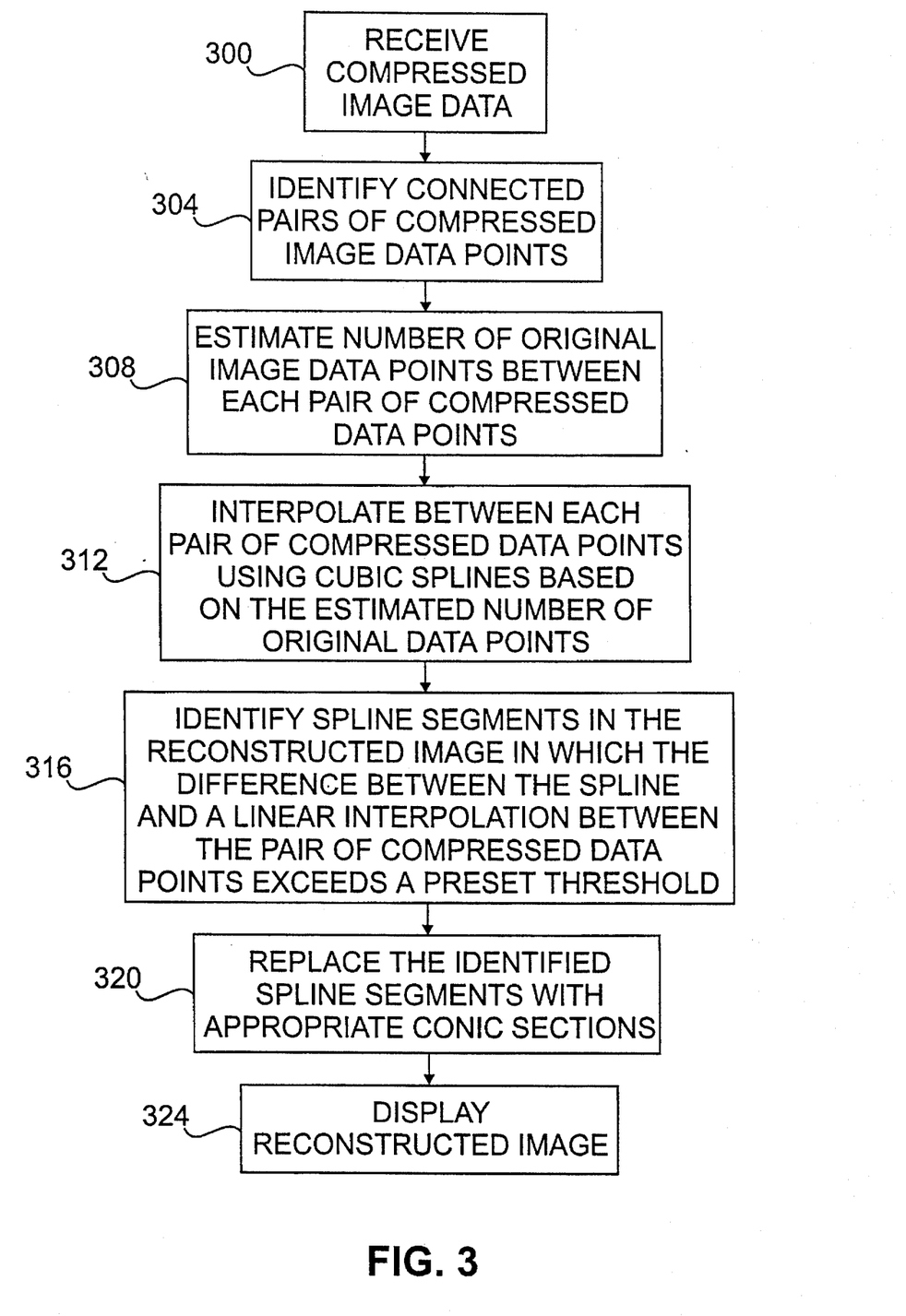
FIG. 3 is a flow diagram illustrating an exemplary image reconstruction method in accordance with the present invention.

FIG. 3 is a flow diagram illustrating the steps of an exemplary image reconstruction method in accordance with the present invention. In operation block 300, the compressed image data is received from, for example, storage means 16 or directly from compression means 14. This compressed image data may result from applying a prior art decompression technique to another set of compressed image data because, as noted above, a compressed image is any image which contains less image information than the corresponding original image. Connected pairs of compressed image data points, which each specify a linear segment in a linear segment approximation of the reconstructed image, are then identified, as noted in block 304. The connected pairs may be identified using any of a number of known techniques including, for example, interpreting stroke information added to the electronic image as described in the above-cited U.S. Pat. No. 5,285,506.

The timing information lost in the compression process, corresponding to, for example, the number of original image data points between each connected pair of compressed image data points, is then estimated, as noted in block 308. As previously mentioned, a timing model can be used herein to estimate timing information by specifying a curve parametrization. A number of different timing models, suitable for estimating timing information in accordance with the present invention, will be described below.

In one exemplary embodiment of the present invention, a linear time timing model is used to estimate the number of original image data points between each connected pair of compressed image data points. The linear time model involves estimating a fixed number of original image data points between connected pairs of compressed image data points, such that the same fixed number is estimated between each connected pair. The linear time model thus assumes that straight-line portions of, for example, a signature, were written at a faster speed than the high curvature portions thereof. The fixed number of data points between each pair of compressed points specifies a curve parametrization, rather than an actual number of data points. As will be described in greater detail below, the curve segments used to reconstruct the image are generally specified by analytical expressions, such as cubic splines and conic sections. The actual number of data points in a plot or other display of the reconstructed image may therefore be chosen to accommodate any desired display resolution.

In another exemplary embodiment of the present invention, a constant velocity timing model is used to estimate the number of original image data points between each connected pair of compressed image data points. Under the constant velocity model, the estimated number of original image data points between each pair of compressed image data points is assumed to be proportional to the distance between the pair. The constant velocity model thus assumes that straight-line portions of, for example, a signature, were written at the same speed as high curvature portions thereof. A pair of compressed image data points which are far apart may therefore be assigned more original image data points than a pair which are close together, allowing improved interpolation between compressed points for certain types of images, such as handwriting. The constant velocity model specifies a curve parametrization rather than an actual number of estimated data points in a particular distance. Again, the actual number of data points may be chosen to accommodate any desired display resolution.

In other exemplary embodiments of the present invention, any of a number of different mathematical functions may be used to estimate a number of original image data points between each connected pair of compressed image data points as a function of the distance between the pair. One such function, which is particularly well-suited to reconstructing images of handwriting, is the square root of the distance between a connected pair of compressed image data points. A timing model based on the square root of the distance is used to produce the reconstructed images of FIGS. 6(a) and (b) described below.

The timing information may also be estimated using other timing models, such as, for example, estimating fixed numbers of original image data points only for certain image segments, while using a number of points proportional to distance, or more generally as a function of distance, for other segments. Regardless of the specific technique used to estimate the timing information, the described embodiments improve the decompression quality without the need for an increase in the amount of compressed image data.

The next step in the reconstruction method of the present invention involves interpolating, or curve fitting, between each pair of compressed image data points using a set of curve segments known as a spline. Spline interpolation is well-known in the art and described in, for example, C. de Boor, "A Practical Guide to Splines," Springer-Verlag, New York, 1978. A spline, also referred to as a piecewise curve, is fit to the compressed image data points and the estimated number of original image data points therebetween as determined in operation block 308. A single spline segment is usually fit to each connected pair of compressed image data points and the estimated number of original image data points corresponding thereto, such that the set of segments in combination form a reconstructed image. Spline coefficients are chosen such that the piecewise curve has continuous tangents and curvatures. The estimated timing information of the present invention specifies a curve parametrization which is used to determine an appropriate spline segment between a pair of compressed image data points. Parametrization is well-known in the art and described in, for example, pp. 315–318 of the above-cited C. de Boor text, which are incorporated by reference herein.

In a preferred embodiment of the present invention, cubic polynomial splines are used to interpolate between the data points. It should be understood, however, that alternative splines, based on polynomial curves or other functions, may also be used to interpolate between the compressed image data points. Alternatives to cubic polynomial splines include, for example, higher order splines. In addition, it should be noted that other functions, such as, for example, straight lines and parabolas, represent cubic polynomials with certain coefficients set to zero. A cubic polynomial spline segment may therefore be a straight line or a parabola, if such a segment provides an appropriate curve fit to a pair of compressed image data points and the estimated number of original image data points therebetween. The curve fitting process of the present invention thus does not require that each spline segment has a finite curvature.

Depending upon the estimated timing information and the type of splines used in the above interpolation step, spikes or other undesirable deviations may result in the reconstructed image. Such deviations may be reduced by, for example, applying a smoothing operation such as that specified in operation blocks 316 and 320 of FIG. 3. First, spline segments which produce undesirable deviations are identified by, for example, comparing each spline segment with a linear segment connecting the corresponding pair of compressed image data points, that is, the pair to which the segment is fitted. Any spline segment which deviates from the corresponding linear segment by more than a preset threshold may be identified as producing an undesirable deviation. The preset deviation threshold may be, for example, the same amount of preset deviation which caused an original image data point to be identified as a compressed image data point in compression based on linear segment approximation. A variety of other preset thresholds may also be used, as appropriate for a given application.

An additional technique for identifying deviant spline segments involves examining an orthogonal projection of a given spline segment onto a linear segment connecting the corresponding pair of compressed image data points. Any spline segment with an orthogonal projection exceeding the length of the corresponding linear segment may be identified as undesirable. Examples of such spline segments are shown in circles 57 of FIG. 4(a).

The spline segments identified as producing undesirable deviations are then replaced with, for example, a replacement segment generated from an appropriate conic section. Unlike cubic polynomial spline segments, conic section spline segments do not have inflection points. An exemplary inflection point produced by a cubic polynomial spline segment is shown in circle 77 in FIG. 5(a). The appropriate conic section spline segment for replacing a given cubic polynomial spline segment may be one which satisfies the boundary condition that the first derivative of the conic section segment is continuous at the corresponding pair of compressed points and the segment therefore fits smoothly with the segments, if any, to which it is joined on either end. Exemplary conic sections include straight lines, circles, ellipses, parabolas and hyperbolas. As a result of the smoothing process of blocks 316 and 320, any polynomial spline segment which deviates from a linear segment connecting its corresponding pair of compressed image data points is replaced with a conic section spline segment having derivatives satisfying the above boundary condition.

The result of exemplary operation blocks 300 to 320 is a reconstructed image, which may then be displayed or otherwise processed. A signature or other image reconstructed in accordance with the present invention is more like the original than an image reconstructed using prior art techniques. Efficient image data compression techniques, such as linear segment approximation, can thus be used in applications requiring high accuracy in the reconstructed image. For example, the reconstructed image may be compared to a previously-generated image of a genuine customer signature in order to quickly and accurately authorize an electronic POS credit request.

The present invention also includes an apparatus for reconstructing images in accordance with the above-described techniques. The apparatus includes means for identifying pairs of compressed image data points, means for estimating a number of original image data points between each pair of compressed points, means for fitting a spline segment between each pair of compressed points and its corresponding estimated number of original image data points, and means for smoothing the reconstructed image. The means for smoothing the reconstructed image may include means for identifying spline segments producing undesirable deviations, and means for replacing the identified segments with replacement segments. Each of the means in the apparatus of the present invention may be included in, for example, the decompression means 18 of FIG. 1, and may be implemented using, for example, a digital data processor programmed to provide the set of operations described above in conjunction with FIG. 3.

Figure 4A:
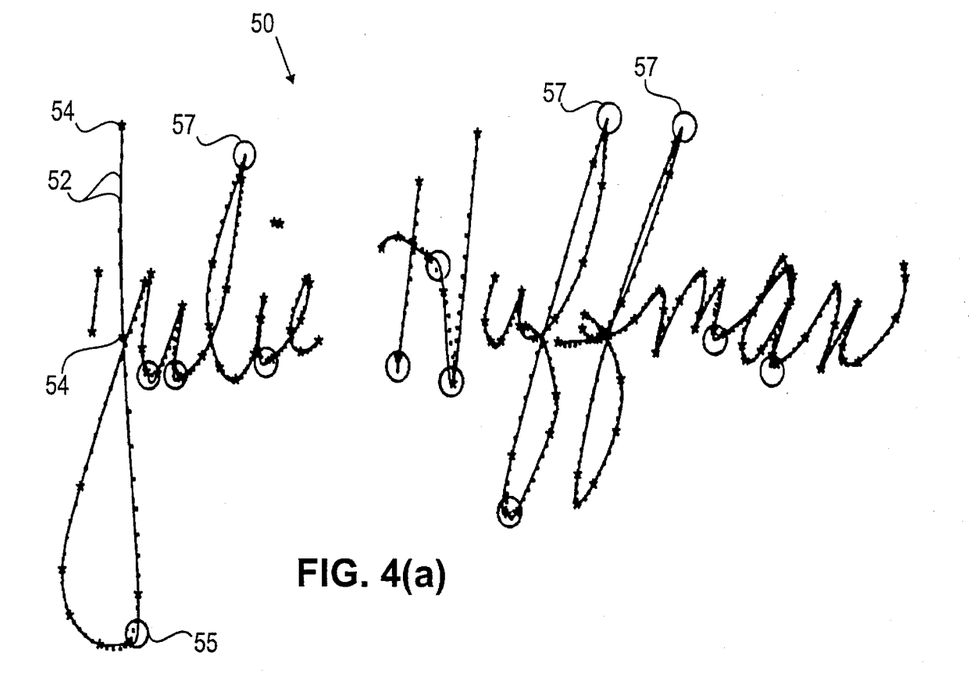
FIG. 4(a) shows an exemplary signature image reconstructed in accordance with the linear time timing model of the present invention.

FIG. 4(a) shows an exemplary signature image reconstructed using timing information estimated in accordance with the linear time timing model of the present invention. The reconstructed image 50 is superimposed on a number of original image data points 52, designated by small dots, and consists of pairs of interconnected compressed image data points 54, designated by asterisks. The image 50 has been reconstructed by applying operation steps 304 through 312 to a compressed image including the compressed image data points. A fixed number of original image data points was estimated between each pair of compressed image data points. Although the reconstruction is improved from that obtained in FIG. 2 using the prior art technique of connecting compressed image data points with linear segments, there are a number of areas in which the reconstructed image 50 deviates significantly from the original image data points 52. Several of these areas are circled in the image 50. For example, the circle 55 shows an area in which the reconstructed image deviates significantly from the original image. The circles 57 show peaks in the reconstructed image where the orthogonal projections of the spline segments onto linear segments connecting the compressed image data points exceed the lengths of the linear segments.

Figure 4B:
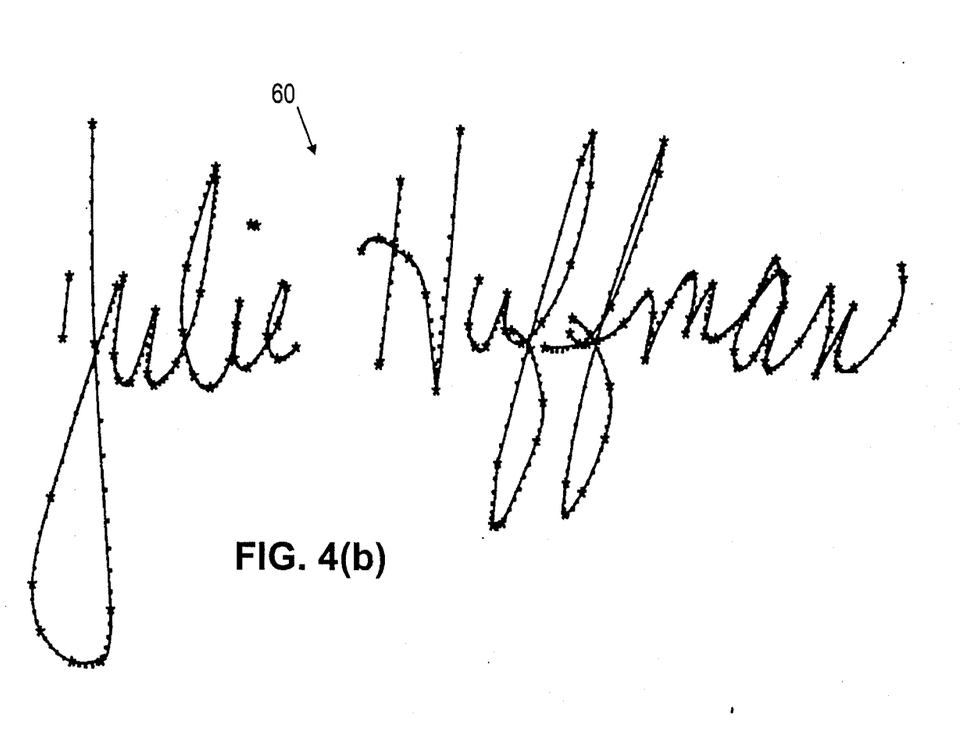
FIG. 4(b) shows the reconstructed image of FIG. 4(a) after smoothing in accordance with the present invention.

FIG. 4(b) shows the reconstructed image of FIG. 4(a) after smoothing in accordance with the present invention. The exemplary smoothing operation specified in operation blocks 316 and 320 of FIG. 3 was applied to the reconstructed image 50 in order to eliminate deviations such as those circled in FIG. 4(a). The image 60 shows the result of the smoothing operation. The polynomial spline segments corresponding to the circled portions of the image 50, and to any other substantial deviations, were first identified and then replaced with spline segments generated from conic sections satisfying the previously-described boundary conditions. The reconstructed image 60 is more like the original image than, for example, the image of FIG. 2 reconstructed using prior art techniques. The reconstruction techniques of the present invention generate a reconstructed image, such as image 60, which more closely resembles natural handwriting.

Figure 5A:
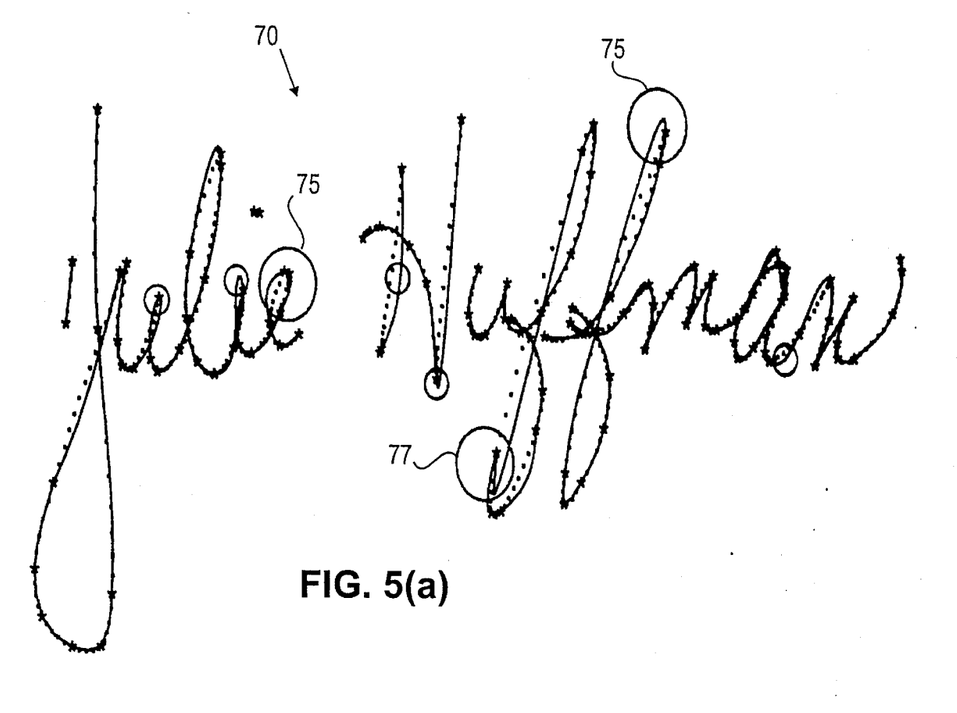
FIG. 5(a) shows an exemplary signature image reconstructed in accordance with the constant velocity timing model of the present invention.

FIG. 5(a) shows an exemplary signature image reconstructed using timing information estimated in accordance with the constant velocity timing model of the present invention. Again, the reconstructed image is superimposed on a number of original image data points, designated by small dots, and includes pairs of interconnected compressed image data points, designated by asterisks. The image 70 has been reconstructed by applying operation steps 304 through 312 to a compressed image including the compressed image data points. The number of original image data points between each pair of compressed image data points was assumed to be proportional to the distance between each pair. As with the linear time model, there may be a number of areas in which the reconstructed image 70 deviates significantly from the original image data points. Several of these areas are circled in the image 70. For example, the circles 75 show areas in which the reconstructed image deviates from loops of original image data points. The circle 77 shows a spike which results from the reconstruction process described in operation blocks 308 to 312 of FIG. 3.

Figure 5B:
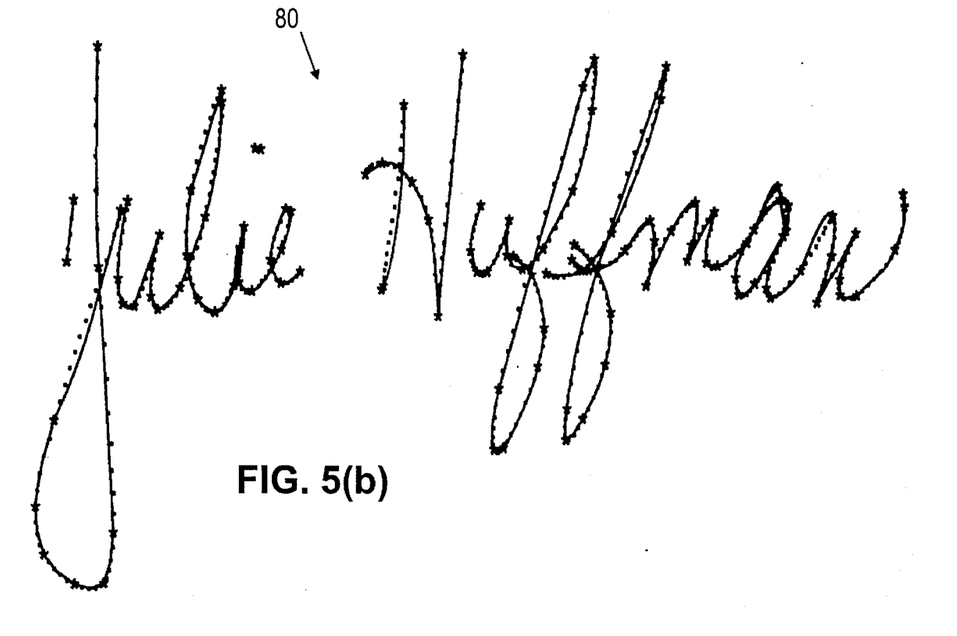
FIG. 5(b) shows the reconstructed image of FIG. 5(a) after smoothing in accordance with the present invention.

FIG. 5(b) shows the result of applying the exemplary smoothing operation of blocks 316 and 320 to eliminate substantial deviations, such as those circled in FIG. 5(a). The polynomial spline segments corresponding to deviant portions of the image 70 were first identified and then replaced with spline segments generated from conic sections satisfying the previously-described boundary conditions. The reconstructed image 80 is significantly more like the original than, for example, the image of FIG. 2 reconstructed using prior art techniques.

Figure 6A:
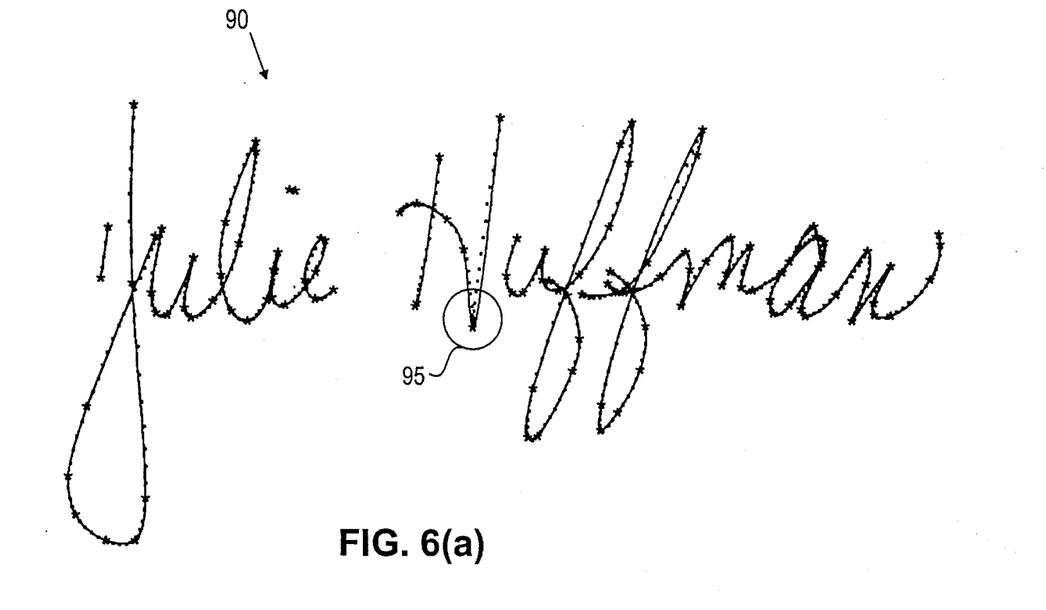
FIG. 6(a) shows an exemplary signature image reconstructed in accordance with a timing model of the present invention based on a square root of the distance between compressed image data points.
Figure 6B:
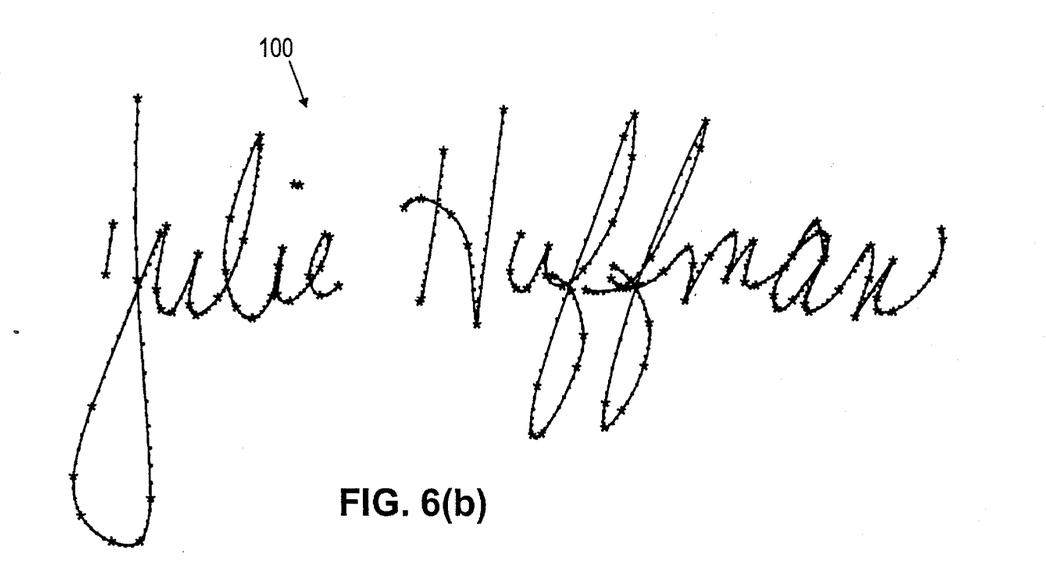
FIG. 6(b) shows the reconstructed image of FIG. 6(a) after smoothing in accordance with the present invention.

FIG. 6(a) shows an exemplary signature image reconstructed in accordance with the present invention using a timing model based on a square root of the distance between connected pairs of compressed image data points. As in FIGS. 4 and 5, the reconstructed image is superimposed on a number of original image data points, designated by small dots, and includes pairs of interconnected compressed image data points, designated by asterisks. The image 90 was reconstructed by applying operation steps 304 through 312 to a compressed image including the compressed image data points. The number of original image data points between each pair of compressed image data points was assumed to be a function of the square root of the distance between each pair. As with the images reconstructed using the other timing models, there may be areas in which the reconstructed image deviates significantly from the original image data points. One such area is shown in circle 95 of FIG. 6(a).

FIG. 6(b) shows a reconstructed image 100 which results from applying the exemplary smoothing operation of blocks 316 and 320 to eliminate substantial deviations in the image 90 of FIG. 6(a). Again, the resulting reconstructed image corresponds very closely to the original image data points.

As demonstrated in the examples of FIGS. 4, 5 and 6, the timing estimation techniques of the present invention result in improved reconstructed images. The estimation technique chosen for a particular application may vary depending upon a number of factors, including the type of image and the sample rate.

It should be noted that the present invention may be readily applied to many other applications, such as, for example, enhancing image data obtained from handwriting capture devices operating at low sample rates, or improving images previously reconstructed using any of a number of different decompression techniques. In addition, although particularly well-suited to reconstructing handwriting images, the present invention may be used to reconstruct other types of images, regardless of the type of compression used. Many variations may be made in the arrangements shown, including the type of image, the compression and decompression techniques used, the timing models used to estimate timing information, and the type of spline segments in the reconstructed image. These and other alternatives and variations in the arrangements shown will be readily apparent to those skilled in the art, and the present invention is therefore limited only by the appended claims.

What is claimed is:

1. A method of generating a reconstructed image from a compressed image having a plurality of compressed image data points, said method comprising the steps of:

identifying pairs of said compressed image data points having a connection therebetween in a linear segment approximation of said reconstructed image;

estimating a number of original image data points between each of said connected pairs of said compressed image data points;

fitting a cubic polynomial curve segment to each of said pairs of compressed image data points and said estimated number of original image data points corresponding thereto, such that said curve segments in combination form said reconstructed image;

identifying at least one of said cubic polynomial curve segments in said reconstructed image which produces an undesirable deviation in said reconstructed image; and replacing said identified cubic polynomial curve segment with a conic section segment having a continuous derivative at said pair of compressed image data points to which said curve segment is fitted, in order to smooth said reconstructed image.

2. The method of claim 1 wherein said step of estimating said number of original image data points further includes estimating a fixed number of original image data points between each of said pairs.

3. The method of claim 1 wherein said step of estimating said number of original image data points further includes estimating a number of original image data points between each of said pairs as a function of a distance between said pair.

4. The method of claim 3 wherein said function is a square root of said distance.

5. The method of claim 1 wherein said step of estimating said number of original image data points further includes estimating a number of original image data points between each of said pairs proportional to a distance between said pair.

6. A method of generating a reconstructed image from a compressed image having a plurality of compressed image data points, said method comprising the steps of:

identifying pairs of said compressed image data points having a connection therebetween in a linear segment approximation of said reconstructed image;

estimating a number of original image data points between each of said connected pairs of said compressed image data points; and fitting a spline segment to each of said pairs of compressed image data points and said estimated number of original image data points corresponding thereto, such that said fitted spline segments in combination form said reconstructed image.

7. The method of claim 6 wherein said step of estimating said number of original image data points further includes estimating a fixed number of original image data points between each of said pairs.

8. The method of claim 6 wherein said step of estimating said number of original image data points further includes estimating a number of original image data points between each of said pairs proportional to a distance between said pair.

9. The method of claim 6 wherein said step of estimating said number of original image data points further includes estimating a number of original image data points between each of said pairs as a function of a distance between said pair.

10. The method of claim 9 wherein said function is a square root of said distance.

11. The method of claim 6 wherein said step of fitting a spline segment to each of said pairs of compressed image data points further includes fitting a polynomial curve segment to each of said pairs.

12. The method of claim 6 wherein said step of fitting a spline segment to each of said pairs of compressed image data points further includes fitting a cubic polynomial curve segment to each of said pairs.

13. The method of claim 6 further including the step of smoothing said reconstructed image.

14. The method of claim 13 wherein said step of smoothing said reconstructed image further includes the steps of:

identifying at least one of said spline segments in said reconstructed image which produces an undesirable deviation in said reconstructed image; and replacing said identified spline segment with a replacement spline segment having a continuous derivative at said pair of compressed image data points to which said identified spline segment is fitted.

15. The method of claim 14 wherein said replacement spline segment having a continuous derivative at said pair of compressed image data points is a conic section segment.

16. An apparatus for generating a reconstructed image from a compressed image having a plurality of compressed image data points, said apparatus comprising:

means for identifying pairs of said compressed image data points having a connection therebetween in a linear segment approximation of said reconstructed image;

means for estimating a number of original image data points represented by each of said connected pairs of compressed image data points; and means for fitting a spline segment to each of said pairs of compressed image data points and said estimated number of original image data points corresponding thereto, such that said fitted spline segments in combination form said reconstructed image.

17. The apparatus of claim 16 wherein said means for estimating said number of original image data points further includes means for estimating a fixed number of original image data points between each of said pairs.

18. The apparatus of claim 16 wherein said means for estimating said number of original image data points further includes means for estimating a number of original image data points between each of said pairs as a function of a distance between said pair.

19. The apparatus of claim 16 wherein said spline segment is a cubic polynomial curve segment.

20. The apparatus of claim 16 further including means for smoothing said reconstructed image.

21. The apparatus of claim 20 wherein said means for smoothing said reconstructed image further includes:

means for identifying at least one of said spline segments in said reconstructed image which produces an undesirable deviation in said reconstructed image; and means for replacing said identified spline segment with a replacement spline segment having a continuous derivative at said pair of compressed image data points to which said identified spline segment is fitted.

22. The apparatus of claim 21 wherein said replacement spline segment having a continuous derivative at said pair of compressed image data points is a conic section segment.

23. A method of generating a reconstructed image from a compressed image having a plurality of compressed image data points, said method comprising the steps of:

identifying pairs of said compressed image data points having a connection therebetween in a linear segment approximation of said reconstructed image;

estimating a number of original image data points between each of said connected pairs of said compressed image data points;

fitting a cubic polynomial curve segment to each of said pairs of compressed image data points and said estimated number of original image data points corresponding thereto, such that said curve segments in combination form said reconstructed image;

identifying at least one of said cubic polynomial curve segments in said reconstructed image which produces an undesirable deviation in said reconstructed image, wherein said step of identifying at least one of said cubic polynomial curve segments producing an undesirable deviation further includes identifying a curve segment which deviates by more than a preset threshold from a linear connection between said pair of compressed image data points to which said curve segment is fitted; and replacing said identified cubic polynomial curve segment with a conic section segment having a continuous derivative at said pair of compressed image data points to which said curve segment is fitted, in order to smooth said reconstructed image.

24. A method of generating a reconstructed image from a compressed image having a plurality of compressed image data points, said method comprising the steps of:

identifying pairs of said compressed image data points having a connection therebetween in a linear segment approximation of said reconstructed image;

estimating a number of original image data points between each of said connected pairs of said compressed image data points;

fitting a cubic polynomial curve segment to each of said pairs of compressed image data points and said estimated number of original image data points corresponding thereto, such that said curve segments in combination form said reconstructed image;

identifying at least one of said cubic polynomial curve segments in said reconstructed image which produces an undesirable deviation in said reconstructed image, wherein said step of identifying at least one of said cubic polynomial curve segments producing an undesirable deviation further includes identifying a curve segment having an orthogonal projection onto a linear segment connecting said pair of compressed image data points which exceeds a length of said linear segment; and replacing said identified cubic polynomial curve segment with a conic section segment having a continuous derivative at said pair of compressed image data points to which said curve segment is fitted, in order to smooth said reconstructed image.

25. A method of generating a reconstructed image from a compressed image having a plurality of compressed image data points, said method comprising the steps of;

identifying pairs of said compressed image data points having a connection therebetween in a linear segment approximation of said reconstructed image;

estimating a number of original image data points between each of said connected pairs of said compressed image data points;

fitting a spline segment to each of said pairs of compressed image data points and said estimated number of original image data points corresponding thereto, such that said fitted spline segments in combination form said reconstructed image; and smoothing said reconstructed image, said step of smoothing said reconstructed image further including the steps of:

identifying at least one of said spline segments in said reconstructed image which produces an undesirable deviation in said reconstructed image, wherein said step of identifying at least one of said spline segments producing an undesirable deviation further includes identifying a spline segment which deviates by more than a preset threshold from a linear connection between said pair of compressed image data points to which said spline segment is fitted; and replacing said identified spline segment with a replacement spline segment having a continuous derivative at said pair of compressed image data points to which said identified spline segment is fitted.

26. A method of generating a reconstructed image from a compressed image having a plurality of compressed image data points, said method comprising the steps of:

identifying pairs of said compressed image data points having a connection therebetween in a linear segment approximation of said reconstructed image;

estimating a number of original image data points between each of said connected pairs of said compressed image data points;

fitting a spline segment to each of said pairs of compressed image data points and said estimated number of original image data points corresponding thereto, such that said fitted spline segments in combination form said reconstructed image; and smoothing said reconstructed image, wherein said step of smoothing said reconstructed image further includes the steps of:

identifying at least one of said spline segments in said reconstructed image which produces an undesirable deviation in said reconstructed image, wherein said step of identifying at least one of said cubic spline segments producing an undesirable deviation further includes identifying a spline segment having an orthogonal projection onto a linear segment connecting said pair of compressed image data points which exceeds a length of said linear segment; and replacing said identified spline segment with a replacement spline segment having a continuous derivative at said pair of compressed image data points to which said identified spline segment is fitted.

* * * * *